United States Patent [19]
Porter

[11] 3,839,150
[45] Oct. 1, 1974

[54] COOLING NUCLEAR REACTOR FUEL
[75] Inventor: William Hugh Lancelot Porter, Dorset, England
[73] Assignee: United Kingdom Atomic Energy Authority, London, England
[22] Filed: Mar. 6, 1973
[21] Appl. No.: 338,516

[30] Foreign Application Priority Data
Mar. 7, 1972 Great Britain.................... 10662/72

[52] U.S. Cl........................ 176/51, 176/38, 176/50, 176/56, 176/61, 176/64, 176/78, 176/87
[51] Int. Cl........................................... G21c 15/00
[58] Field of Search............ 176/38, 50, 51, 56, 61, 176/64, 78, 87

Primary Examiner—Carl D. Quarforth
Assistant Examiner—P. K. Pavey
Attorney, Agent, or Firm—Larson, Taylor & Hinds

[57] ABSTRACT

A nuclear reactor core has a supplementary or alternative means of cooling the fuel in addition the main coolant. This means is termed auxiliary and relies upon a source independent of the main coolant. To obtain maximum benefit from auxiliary coolant this is injected as a series of intermittent high velocity jets from perforated conduits extending parallel with the fuel rods. For instance the velocity of a jet which operates for one-half second every 2 seconds would be quadrupled with no increase in average water usage.

5 Claims, 3 Drawing Figures

3,839,150

COOLING NUCLEAR REACTOR FUEL

BACKGROUND OF THE INVENTION

This invention relates to nuclear reactors in which the fuel is cooled by water, by steam or by a two phase mixture of these. In such nuclear reactors it is usual to employ fuel in a rod or pin form enclosed in suitable cladding and to mount the rods in clusters in parallel, spaced apart, relationship so that coolant may pass freely between them. According to current practice, coolant is passed axially from one end of the cluster e.g., in an upwards direction through the cluster and such coolant flow is effective to extract heat from the fuel under normal circumstances. It has been proposed previously that, in addition to this axial main coolant flow, a supply of coolant, auxiliary to the main coolant be provided to pass laterally into the cluster or to be sprayed over the top of the cluster. The auxiliary coolant supply is usually held in reserve, ready to be brought into effect should the main coolant system prove inadequate or ineffective for some reason. In a particular case, the auxiliary coolant has been applied to the fuel by being led from the supply along conduits extending parallel with the fuel rods in the cluster and sprayed onto the fuel via holes in the conduits or injected transversely through a series of holes in the conduit wall within the cluster. In both cases the coolant is applied as a plurality of jets of coolant which impinge on the fuel rods. This facility for injecting auxiliary coolant is a useful and advantageous mode of bringing coolant directly into interior of the reactor core at the will of the operator. As the source of auxiliary coolant is a reservoir of finite capacity it is necessary to employ the coolant as economically as possible and to the best effect.

To provide a uniform spray distribution from a conduit extending parallel with the cluster it is desirable to place as many holes as possible along the length of the, or each, conduit. There is a lower limit to the size of each hole set by the probability of the holes to become blocked up by solid particles carried in the auxiliary coolant. These considerations would lead to a design where the conduit would have a large number of holes of generous size. However, in practice, it is desirable for each jet to emerge from the hole with a reasonably high velocity, so as to carry coolant well into the cluster, and to meet this further requirement a design with a large number of large holes would consume in operation copious supplies of coolant. Again, in a practical case, the supply of coolant available at this region of reactor core tends to be rather limited.

SUMMARY OF INVENTION

According to the present invention an auxiliary cooling system for a nuclear reactor core comprises at least one perforated conduit extending into the core a supply of auxiliary coolant, a pump arranged to delivery auxiliary coolant from the supply to the perforated conduit and intermittent flow inducing means causing the auxiliary coolant to be dispensed through the perforations in the conduit as intermittent jets of coolant.

By the use of intermittent jets of coolant, a limited supply of coolant may be ejected onto the fuel rods with greater velocity than if the jets were continuous and hence will penetrate more strongly amongst the fuel rods and this through holes large enough to give an adequate flow rate being less liable to blockage than smaller holes designed to conserve coolant.

By applying the present invention to the auxiliary cooling system employed in nuclear reactors of the pressure tube type (such as the Steam Generating Heavy Water Moderated Reactor), the velocity of the jets of auxiliary coolant may be increased giving greater penetration into the coolant cluster for a given average water flow rate by operating the jets intermittently, the jet velocity being increased in inverse proportion to the fractional time the jet is operated in each cycle. For instance the velocity of a jet which operates for 1/2 second every 2 seconds would be quadrupled and there would be no increase in average water usage. Similar effects may be achieved in the application to sparge tubes to pressurized water reactors.

DESCRIPTION OF THE DRAWINGS

In order that the invention may be better understood embodiments thereof will now be described with reference to the accompanying drawings in which.

DESCRIPTION OF THE PREFERRED EMBODIMENTS

Figure 1:
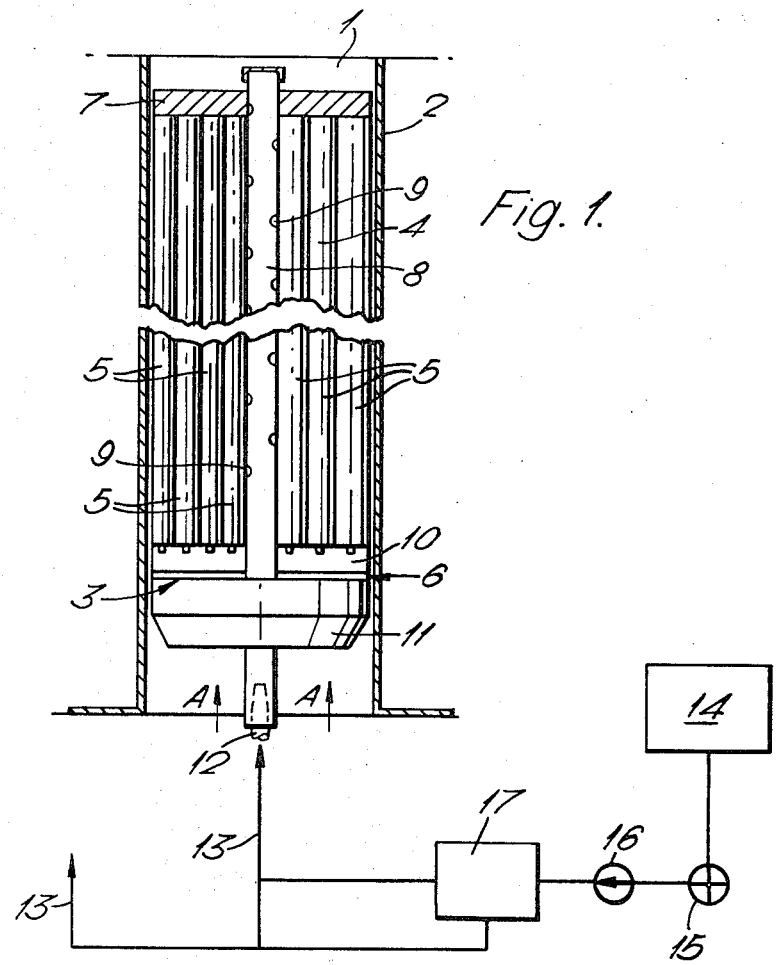
FIG. 1 shows an axial cross-section through an axially extending nuclear reactor coolant channel and indicating diagrammatically one system by which auxiliary coolant may be deployed

In FIG. 1 a coolant channel of a pressure tube nuclear reactor such as that known as the Steam Generating Heavy Water Moderated Reactor is bounded by an open ended cylindrical wall 2. Within the channel 1 is mounted, in a manner such that it may be withdrawn endwise through the top of the channel, a support structure 3 which carries a cluster 4 of nuclear fuel rods 5 in parallel spaced apart positions so as to define interspaces for the passage of main coolant flow. Main coolant A is passed through the bottom of the channel to pass upwardly through the lower end fitting 6 of the structure 3 and between the fuel rods 5 to pass through the upper end fitting 7. In its passage through the channel the coolant boils and vapour from the top of the channel passes to a power plant. Centrally of the support structure is provided a central sparge tube 8 whose upper end is closed and whose lower end communicates with a supply of auxiliary coolant of the same kind as the main coolant. The tube 8 has holes 9 distributed along its wall and the holes being of a diameter such that accidental blockage is unlikely to occur. When an auxiliary coolant at a suitable pressure is introduced into the lower end of the tube 8, sprays of coolant are delivered from the holes 9 into the centre of the cluster of fuel rods.

The lower end fitting 6 is adapted to receive the lower ends of the fuel rods 5 which engage holes in a grid 10 which, together with a dependent skirt 11, is supported centrally on the sparge tube 8. Where the latter extends through the grid 10 a number of webs not shown extend radially between the tube 8 and the skirt 11, the cross-sectional area between the webs constitutes the entry passage for the main coolant.

Figure 1A:
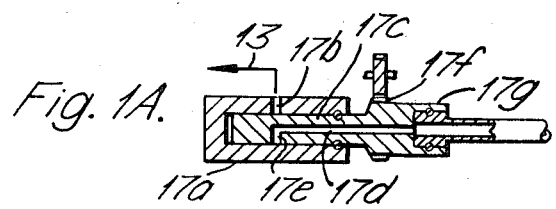
FIG. 1A is a detail of FIG. 1

The lower end of the sparge tube 8 sealingly engages a nozzle 12 of an auxiliary coolant supply pipe 13. When required auxiliary coolant is pumped from a tank 14 under control of a valve 15 by a pump 16 which delivers coolant to a valve 17 which feeds a number of sparge tubes as at 8 in succession so that each receives an intermittent supply. As a result the delivery from the holes in the tubes 8 is intermittent. The valve 17 as shown in FIG. 1A comprises a stationary cylinder 17a having a number of ports 17b, corresponding to the number of sparge tubes as at 8 to be supplied, in the cylinder well at circumferentially spaced positions. Each port 17b communicates with one such sparge tube. A spindle 17c rotatable in the cylinder bore has an axial passage 17d leading to a radial hole 17e positioned to communicate the passage 17d with each of the ports 17b as the spindle rotates. Rotation of the spindle is effected by a motor (not shown) driving a gear 17f and coolant supplied to the passage 17d via swivel coupling 17g. In a modification spindle 17c may be rotated by the hydraulic pressure acting on a suitably bladed portion of the rotary spindle. Auxiliary coolant is supplied through the valve 17 through each of the outlet ports in the cylinder hence giving intermittent supplies to each of the sparge tubes 8 to emerge through holes 9 as high velocity intermittent jets so that good penetration of auxiliary coolant into the fuel rod clusters are obtained.

Figure 2:
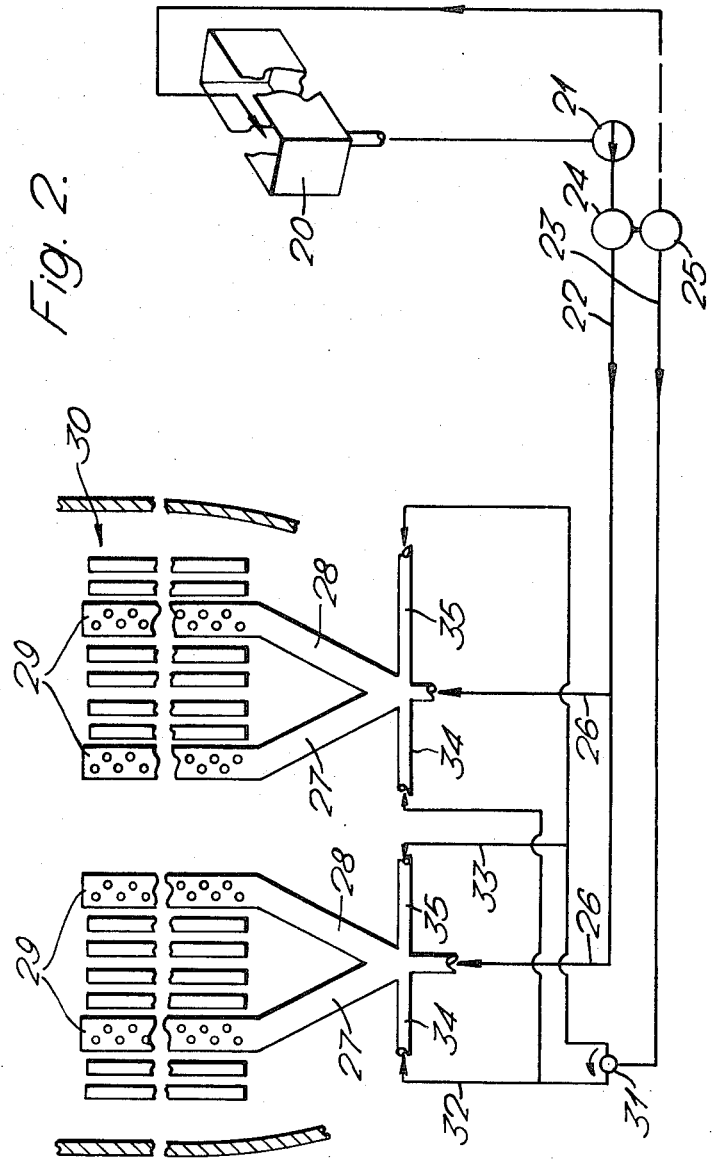
FIG. 2 shows an alternative method of controlling the distribution of auxiliary coolant with a number of sparge pipes protruding into the core of a pressurized water nuclear reactor a part only of which is shown.

A modified form of the invention shown in FIG. 2 employs fluidic switches of the bistable Coander type to achieve intermittent flows. In FIG. 2, the source of auxiliary coolant is a reservoir 20 from which pump 21 delivers coolant either back into the reservoir 20 or into both main and subsidiary lines 22 and 23 according to the position of valves 24, 25. The latter are arranged to operate in unison when auxiliary cooling is needed to direct coolant into lines 22, 23, the main line 22 connecting with parallel lines 26 each supplying one of the branch pipes 27, 28. Each branch pipe is connected to one perforated sparge pipe 29 which protrudes into the core 30 of a nuclear reactor cooled and moderated by pressurised water in a conventional manner. Intermittent jets of auxiliary coolant from the sparge pipes 29 are obtained by switching the flow alternately between the branch pipes 27, 28 by the operation of fluidic switches. As is known the flow through pipes 26 will attach themselves to one or other of the branch pipes 27 or 28 at certain Reynolds numbers and the injection of a subsidiary flow through the jet 34 will cause the flow to switch from branch 27 say to the other branch 28 and likewise a subsidiary flow from jet 35 whilst coolant is flowing through branch 28 will re-switch the flow back to branch 27. To operate the fluidic switches, the subsidiary line 23 leads a bleed of coolant to a rotary valve 32 which operates to supply control tubes 32, 33 alternatively. The tube 32, supplies one of the two control jets 34 of each switch and the tube 33 then supplies the other of the control jets 35. In consequence of the operation of the rotary valve 32 the control jets 34, 35 operate alternately so switching the main flows in pipes 26 first to branch pipe 27 and then pipe 28 and back again. This results in intermittent jets of auxiliary coolant being emitted from sparge pipes 29. This continues until as long as the rotary valve 31 operates and the valves 24, 25 remain in the operative position. When auxiliary cooling is no longer required the valves 24, 25 are operated to divert pump delivery back into the reservoir 20. The pump 21 may continue to recycle coolant if desired so ensuring that it is instantly available. The sparge pipes 29 may be placed in any positions in the core where auxiliary cooling may be effective. Means may be provided for initiating the application of auxiliary cooling on failure of the main reactor cooling system which has not been described, but which is always assumed to be present the use of fluidic switches has the advantage that large mass flows are not subject to large pressure variations.

As an alternative to both the above embodiments, the delivery of pump 16 may be connected directly in parallel with the sparge pipes and the delivery pulsed so as to create oscillating pressures in the auxiliary coolant flow.

I claim:

1. An auxiliary cooling system in a nuclear reactor core comprising at least one perforated conduit extending into the core, a supply of auxiliary coolant, a pump arranged to deliver auxiliary coolant from the supply to the perforated conduit and an intermittent flow inducing means causing the auxiliary coolant to be dispersed through the conduit perforations as intermittent jets of coolant.

2. An auxiliary cooling system for a nuclear reactor as claimed in claim 1 in which the intermittent flow inducing means comprises a rotary valve arranged to deliver the auxiliary coolant to a number of perforated conduits in turn.

3. An auxiliary cooling system for a nuclear reactor as claimed in claim 1 in which the intermittent flow inducing means comprises a bistable fluidic switch arranged to switch the pump delivery to a number of perforated conduits in turn.

4. A nuclear reactor the reactor having a core including a coolant channel enclosing a nuclear fuel assembly, an entry for main coolant at one end of the channel and an exit for main coolant at the other, at least one perforated conduit extending lengthwise in the channel, perforations in the conduit wall facing said fuel assembly, a supply of auxiliary coolant and means delivering said coolant to said perforated conduit in a manner such that intermittent jets of auxiliary coolant are injected into the fuel assembly.

5. A nuclear reactor plant including a reactor core containing nuclear fuel assemblies in the form of clusters of elongated fuel rods supported in spaced apart positions to define channels there between for the passage of main coolant, at least one perforated conduit extending parallel to but spaced from the fuel rods, a supply of auxiliary coolant, and a means connecting said supply with said perforated conduit and delivering auxiliary coolant there through to emerge from the perforations in the perforated conduit as intermittent jets.

* * * * *